Jan. 18, 1966     F. M. SMITH     3,229,388
EDUCATIONAL DEVICE
Filed July 31, 1963     2 Sheets-Sheet 1
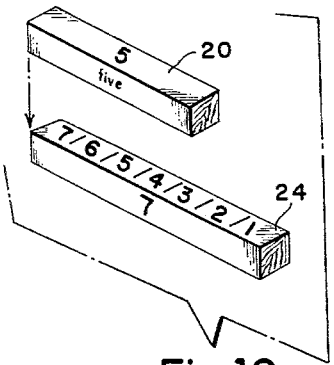
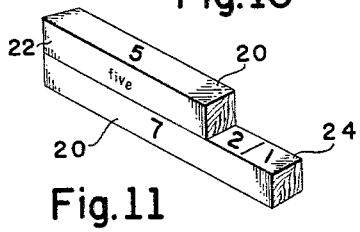
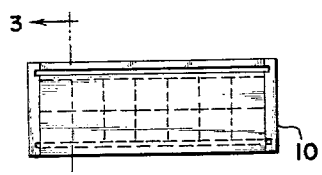
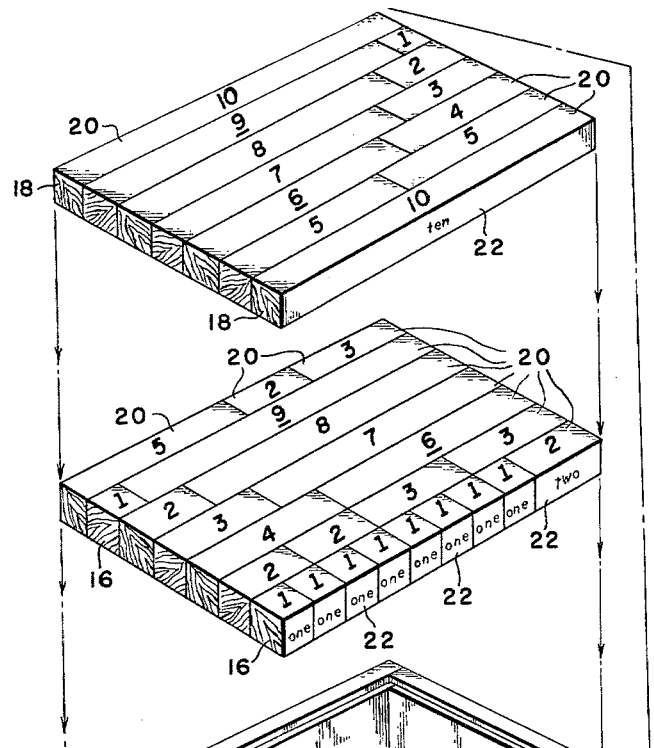
INVENTOR.
FRANK M. SMITH
BY *John Cyril Malloy*
ATTORNEY Jan. 18, 1966  F. M. SMITH  3,229,388
EDUCATIONAL DEVICE
Filed July 31, 1963  2 Sheets-Sheet 2
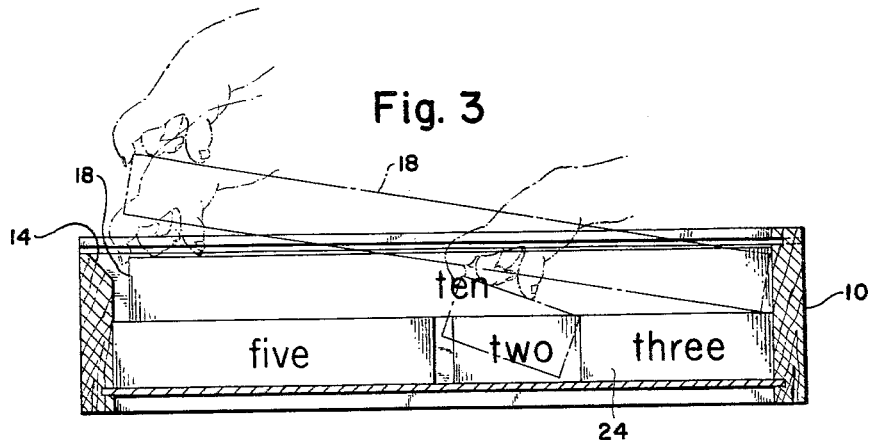
Fig. 3
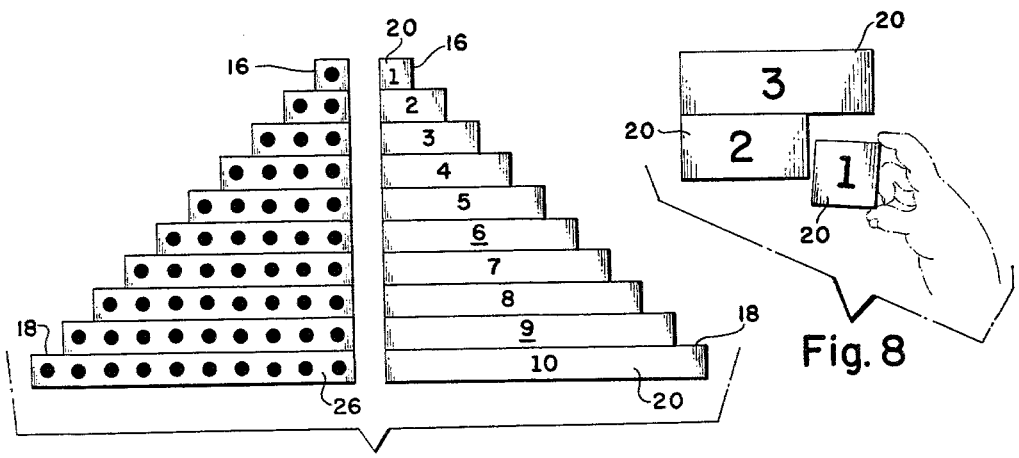
Fig. 7
Fig. 8
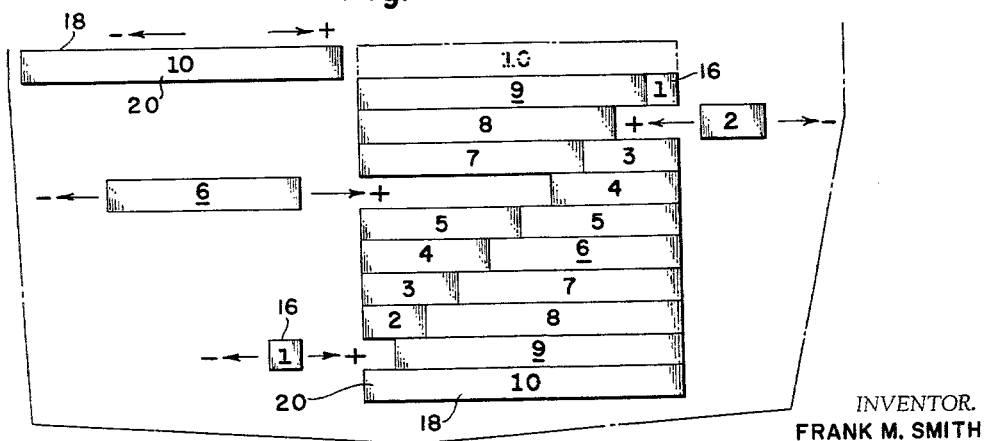
Fig. 9
INVENTOR.
FRANK M. SMITH
BY John Cyril Malloy
ATTORNEY ies Patent Office 3,229,388
Patented Jan. 18, 1966

1

3,229,388
EDUCATIONAL DEVICE
Frank M. Smith, 2328 Hollywood Blvd., Hollywood, Fla.
Filed July 31, 1963, Ser. No. 298,929
3 Claims. (Cl. 35—70)

This invention relates to an educational device, and, in particular, to a set of blocks, bearing numerical indicia, and peculiarly adapted to teaching the fundamental operations of arithmetic to the very young. It is appreciated that blocks in various forms and designs for this general purpose have been proposed heretofore, but have apparently failed to find favor or acceptance, due to serious shortcomings, it is, therefore, a general object of the present invention to provide a block system with features representing improvements over prior art devices, and not subject to shortcomings as aforesaid.

Other objects include the following: To provide a universally symmetrical basic unit in the block system, whereby the only variable to be observed is one of length, with consequent simplification of the object example to the student; to further avoid confusion by distributing the various forms of number indicia about the block, so that, when properly oriented, one at a time is dominantly viewable; specifically, to provide blocks of square cross section, with indicia on all four sides, and further, to provide such blocks in duplicate, so that all four indicia may be viewed simultaneously, if desired; to provide for a subtracton process by superposition, as in the case of addition; to provide for objective viewing of the arithmetic operations by surface-to-surface association of the blocks, whether in side-by-side relation, or upon superposition; and to provide a system which is conveniently boxed and easily removed from its container.

These and other objects, which will be apparent, are attained by the present invention, a preferred form of which is described in the following specification, as illustrated in the drawing, in which:

FIG. 1 is a bracketed view, in perspective, of the set of the two layers of blocks, their storage box, and the cover therefor, shown in exploded form;

FIG. 2 is a front elevational view of the box, on reduced scale;

FIG. 3 is a sectional view through the box and contents, taken on the plane of the line 3—3 of FIG. 2, on the general scale of that of FIG. 1;

FIG. 4 is a perspective view of one of the blocks;

FIG. 5 is a perspective view, showing two other sides of the block of FIG. 4;

FIG. 6 is a sectional view, transversely of the block of FIG. 4, taken on the plane of the line 6—6 thereof;

FIG. 7 is a bracketed view, which may be considered as either in top plan or side elevation, showing a particular arrangement of two duplicate sets of blocks;

FIG. 8 is a top plan view of the placement of a group of blocks in an elementary problem in addition;

FIG. 9 is a top plan view of an arrangement of a panel of blocks, showing examples of operations of addition and alternative subtraction;

FIG. 10 is a bracketed view in perspective, showing a pair of blocks in position preliminary to an operation of subtraction by superposition; and FIG. 11 is a perspective view of the blocks of FIG. 10, in final placement.

Referring to the drawings by characters of reference,

2 there is shown a rectangular storage box 10 of generally conventional, rectangular construction, with a slide cover 12. For ready access to the contents, for removal, the front wall of the box is provided with an inwardly, downwardly slanted, bevelled, upper edge 14. As seen in FIG. 3, the box is also constructed so that the length of its chamber is somewhat in excess of the maximum length of block, for further reasons of access, as indicated in the phantom line showing in FIG. 3.

With reference to the example shown in FIG. 7, the blocks are in ten different lengths, representing consecutive multiples of a unit block 16, up to a block 18, of a maximum length equal to ten units, and in the entire complement of blocks, these are provided in at least two, complete, identical sets, for reasons to be set forth hereinafter.

The blocks are in the form of rectangular prisms, of square cross section, and each of the four sides is provided with a form of indicia, which is different on each of the four sides, but is similar, as a group, on the respective blocks of different length. This is illustrated in FIGS. 4 and 5, showing the four different sides of a block 18 in two different views, one side 20 bearing the cardinal numeral corresponding to the length of the block, as expressed in the number of multiples of the dimension of the unit cube; another side 22, bearing the word name of the cardinal numeral, a third side 24, bearing the sequence of cardinal numbers, from 1 to the maximum representing the length of the block, and a fourth side 26, bearing a series of dots spaced for registering with the sequence cardinals, lengthwise of the block. To avoid confusion, reference characters have not been applied to all of the blocks, of various sizes, but it will be understood that each has a makeup corresponding to that of block 18, the only difference being in the name or numeral of the cardinals, and the number of dots. Where reference characters are needed for reference to the other lengths of blocks, those of block 18 will be employed.

Among people who have matured beyond the stage of early childhood, there is a tendency to become oblivious to the early problems of grasping the significance of the operations of simple arithmetic, and to take the various rules for granted. For instance, most people take the act of counting, in sequence, as a natural fact of life, without realizing that it is actually the statement of a series of sums obtained by adding 1 to the preceding number at each step. Although this was once unobvious to most individuals, they have long since lost sight of the fact. FIGURE 8 illustrates a demonstration of this operation, wherein a block carrying a designation of 2 has been positioned in juxtaposition to a block of length 3. By interposing the block of unit length in the corner space at the end, the student provides himself with a graphic and forceful illustration of the fact that 1, when added to 2 is the same as 3. He may also go further and place the 2 block at the right end of the 3 block and the 1 block at the left end thereof, in illustration of another mathematical fact, usually taken for granted, that 2 plus 1 is the same as 1 plus 2. Pursuing this concrete procedure, the student may proceed to find that 1, added to any number produces the next higher number in a sequence which he ultimately understands as the counting process.

The operation illustrated in FIG. 7 is even more elementary than the concept of counting, since it directly illustrates the physical meaning of any cardinal number, by impressing on the mind that a certain number of dots corresponds to a given numeral, the common ground of recognition being the identical lengths of the two blocks under comparison.

It is also possible to compare the dots with the cardinal number by simultaneously observing two sides of a single block, viewed as in FIG. 5, for instance, or some other rotated position of the block.

The general problems of addition may involve the use of more than two blocks in association with a single block representing the sum to be determined, or illustrated. However, as a first step, it is preferable to work with three blocks, as in the case of FIG. 8, but varying the value of the added component. For instance, a rectangular panel of blocks may be arranged as in FIG. 9, so as to add up to 10, in series of two in each row. Thus, removal of the 10 block will illustrate the problem of subtracting 10 from 10, which leaves 0. Conversely, replacing the 10 block illustrates the addition of 10 to 0, equalling 10. In the same manner, 1 plus 9 and 2 plus 8 are shown as equalling 10, and so on, in sequence down through 8 plus 2 and 9 plus 1 to 10 plus 0 again, and the converse operations of withdrawal will illustrate subtraction. Following this stage, the student's education may be advanced by the more complicated problem of matching a length with more than two components, such as 2 plus 3 plus 5, to equal 10, and at this stage the student's interest will probably have been aroused to a state of independent thinking, due to the challenges involved, and as nourished by the degree of recreational aspects inherent in the activity. For these advanced problems, certain of the blocks of lesser length, especially length 1, are provided in plurality, beyond the duplicate sets of blocks shown in FIG. 7, and the array of such blocks, in addition to those shown in in FIG. 9, is shown grouped in the lower layer of the box, in FIG. 1.

Subtraction by superposition is illustrated in FIGS. 10 and 11, wherein the problem consists in subtracting 5 from 7. In this case the student selects the 7 block, and places it so that the surface 24 with the cardinal numbers in sequence, is facing upwardly. Preferably, the sequence will run from right to left, and since the student has learned to count at this stage, he will be able to understand and accept a mere change in direction. This reversal, constitutes a preferred form because it caters to a natural, and strong inclination to work from the left end in superposing the block constituting the subtrahend, and while the operation may also be carried out with the cardinal sequence in the normal, left-to-right order this will demand caution and alertness, to superpose at the right end.

Assuming then, that the problem is to subtract 5 from 7, the student will select the 5 block, and lay it on the 7 block, in such manner that their left ends are flush. This leaves exposed the first two units on upper face 24 of the 7 block, which the student immediately interprets as the equivalent of a block 2 units long, immediately leading to the answer that the remainder, or difference, is 2. This single example adequately illustrates the case of subtraction for any combination of block pairs.

After subtraction by superposition the student may be indoctrinated into the general concept of checking results by selecting a block having the value of his remainder, and performing the addition by placing it on the vacant corner.

It will be understood that in lieu of facing upwardly, the sequence surface 24 may be arranged to face sidewise, in which case the subtrahend, or short block is placed in front of the surface 24.

Although the surface 20, containing the cardinal numeral is turned upward, as the working face, in the problem illustrated in FIGS. 10 and 11, any of the other three faces may be used as the operator, and as in all other problems involving the blocks, two faces will, in general, be either plainly exposed, or easily viewable simultaneously, so that the intercomparisons, which are part of the educational problem are of frequent occurrence and, therefore, conducive to efficient results in exploiting the memory process.

Many of the hereinbefore-enumerated objects flow from a construction wherein the blocks are square in cross section, and arranged in lengths which are multiples of the common dimension of the unit cube. This entails a universality of symmetry in the unit block, which narrows the degree of required perception by the student to a simple comparison of multiples of length, all other things being equal and, therefore, cancelling out any differences in the basic unit from the array of factors to be considered. This reduction of the problem to simple, and basic factors, is an important consideration in a first introduction of the very young to such a complicated subject as mathematics.

Another feature of blocks of this construction is the placing thereon of four different forms of indicia of the number representing the length, or number of multiples of the unit cube, and a related feature is that two of these may be plainly exposed at any position of use or examination.

Yet another important feature resides in the provision of the multiples, in any block, in sequence, on one face. This enables the very competently instructive system of subtraction by superposition, which is present in addition to the system of subtraction by withdrawal.

In still another feature, the provision of the sequence of blocks, from 1 to 10, in duplicate, leads to the ready comparison study of numbers and physical objects, as illustrated in FIG. 7, and this same duplication makes possible a complete decimal system of two-block addition or subtraction, as illustrated in FIG. 9.

Preferably, the blocks will be constructed of maple wood, with an outer coating of plastic 28 (FIG. 6), of non-toxic material, which is durable, attractive, comfortable to the feel, and easily cleaned, and the indicia, shown generally by the numeral 30 in FIG. 6, may be impressed, intaglio, into the plastic in the molding operation, with or without underlying recesses in the wood, or may be imprinted by a decal process, or other means.

Generally speaking while a certain, preferred embodiment has been shown and described, various modifications will be apparent, in the light of this disclosure, and the invention should not, therefore, be deemed as limited, except insofar as shall appear from the spirit and scope of the appended claims.

I claim:

1. A complement of educational blocks, each block comprising a rectangular solid of square cross section, and having a length corresponding to a multiple of the dimension of a side of said cross section, and the lengths of said blocks covering a range from 1 to 10, inclusive of said multiples, and each carrying indicia corresponding to said multiple, said indicia comprising a symbol on at least one side, and ranging from 1 to the value represented by said symbol, said sequential arrangement running from right to left, in the direction of increasing values; and a rectangular open-top box having side walls, said complement of blocks in said box, one dimension of said box being slightly in excess of the length of the longest of the blocks, for finger clearance, and one of said walls having a beveled inner corner on its top edge, three of the side walls of said box being provided with a common groove parallel to the outer edge of the top of said box and the top edge of the other of said side walls terminates in a line coincident with the floor of said groove and said top being sized for slideable positioning in said groove to provide a roof for said box, said top being of planiform construction and including an exteriorly mounted handle to slide the top relative to the side walls.

2. An educational device comprising, a complement of educational blocks, each block having a plastic exterior coating and comprising a rectangular solid, of square cross section, and having a four-sided length corresponding to a multiple of the dimenison of a side of said cross section, and the respective lengths of said blocks covering a range from 1–10, inclusive, of said multiples, said blocks having indicia on all four sides, and said indicia comprising on each side respectively, (1) a chief cardinal numeral representative of said multiple, (2) the word for the chief cardinal numeral, (3) a continuous ascending sequential arrangement of equidistantly-spaced cardinal numerals from one to the chief cardinal numeral and (4) a plurality of equally spaced defined areas repeated continuously along the block length a number of times equal to the chief cardinal numeral, and a rectangular open top box having side walls for holding said blocks arranged therein in two layers so that the said lower layer may be used as a counting board, one dimension of said box being slightly in excess of the length of the longest of the blocks for finger clearance and one of said walls having a beveled inner edge.

3. An educational device as set forth in claim 2 wherein the indicia are in relief so that a user may manipulate the blocks by feel without actually seeing the indicia.

References Cited by the Examiner
UNITED STATES PATENTS

| | | | |
|---|---|---|---|
| 2,494,497 | 1/1950 | Trapnell | 35—31.4 |
| 2,795,863 | 6/1957 | Warwick | 35—73 X |
| 2,950,542 | 8/1960 | Steelman | 35—31.8 |
| 3,002,295 | 10/1961 | Armstrong | 35—31 |
| 3,094,792 | 6/1963 | Morgan et al. | 35—31 |

FOREIGN PATENTS

| | | |
|---|---|---|
| 321,251 | 5/1902 | France. |

EUGENE R. CAPOZIO, *Primary Examiner.*

LAWRENCE CHARLES, *Examiner.*

W. GRIEB, *Assistant Examiner.*